United States Patent

Herrmann

[15] 3,680,898
[45] Aug. 1, 1972

[54] FURNITURE JOINT

[72] Inventor: Frederick H. Herrmann, 3015 Lakehaven Court, Ann Arbor, Mich. 48105

[22] Filed: May 25, 1970

[21] Appl. No.: 40,941

[52] U.S. Cl............287/20.92 D, 287/20.927, 52/285
[51] Int. Cl.................................................F16b 5/07
[58] Field of Search..287/20.92 D, 20.92 C, 20.92 E, 287/20.92 K, 20.92 G, 20.92 R, 56, 126, 20 R, 20.92 T; 211/177; 248/220.5, 243; 52/285, 20.927

[56] References Cited

UNITED STATES PATENTS

| | | |
|---|---|---|
| 3,044,806 | 7/1962 | Preissler et al..............287/20 R |
| 2,876,275 | 3/1959 | Schulz................287/20.92 C X |
| 189,215 | 4/1877 | Hayward et al..........287/20.927 |
| 1,272,131 | 7/1918 | Silberg.....................287/20.927 |
| 2,845,685 | 8/1958 | Lovgren et al.........287/20.92 X |

Primary Examiner—David J. Williamowsky
Assistant Examiner—Wayne L. Shedd
Attorney—Barnes, Kisselle, Raisch & Choate

[57] ABSTRACT

A furniture joint which can be assembled by unskilled persons into a firm locked condition utilizing a double re-entrant groove for lateral insertion and a right angle lateral motion for locking, with provision to block the joint against dis-assembly.

6 Claims, 8 Drawing Figures

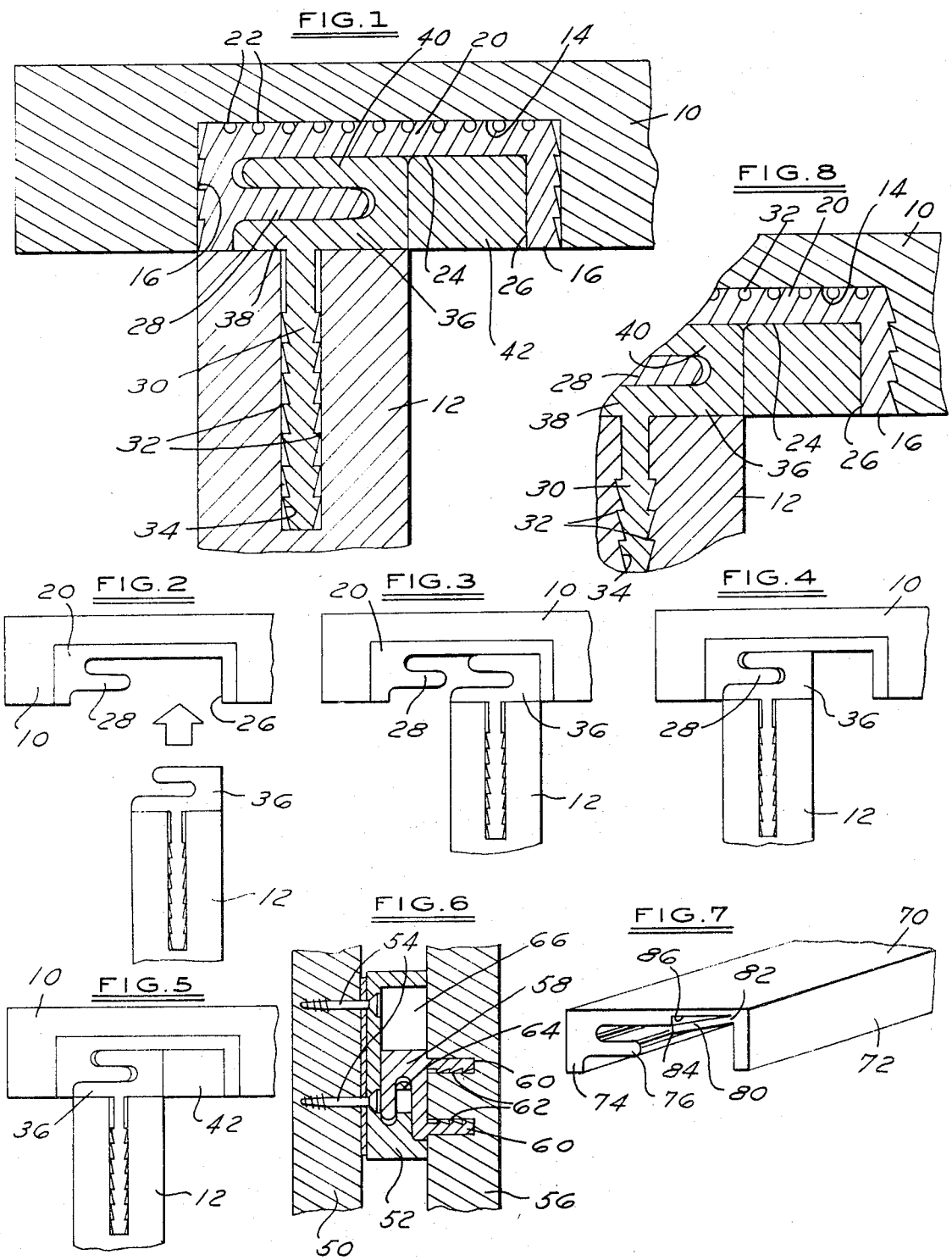

FURNITURE JOINT

This invention relates to a furniture joint and more particularly to a joint which can be assembled by an unskilled person.

It is an object of the present invention to provide a furniture joint which is self-contained in the respective parts to be joined so that various portions of the furniture can be fabricated at the place of use utilizing various components to improve the flexibility of construction and lower the cost.

It is an object of the invention to provide panels and joints inherent therein which can be used for connecting panels, prefabricating cabinets, the mounting of prefabricated cabinets, and the joining of prefabricated storage walls and partitioning systems.

It is a further object of the invention to provide a joint which when locked is secure and firm and which cannot become intentionally separated.

Other objects and features of the invention will be apparent in the following description and claims.

DRAWINGS accompany the disclosure and the various views thereof may be briefly described as:

FIG. 1, a sectional view of a completed joint.

FIGS. 2, 3, 4, and 5, schematic drawings of sequential steps in the assembly of a joint.

FIG. 6, an illustration of the joint utilized for suspending on a vertical wall.

FIG. 7, an illustration of a modified joint construction.

FIG. 8, a modified form of panel-channel interlock.

Referring to the drawings:

In FIG. 1, a panel 10 is joined to a panel 12 with the interlock system of the present invention. The panel 10 has a slot 14 with side walls 16 and securely mounted in this slot is a joint channel 20. This channel has serrated outer walls to register with the walls 16 and preferably has small grooves 22 extending along the base surface thereof which may be used for the retention of glue to provide an interlock on the base and sides. The inner wall 24 of the base of the channel 20 is essentially flat and one side wall 26 is also a straight wall. The other side wall has extending therefrom, in cross-section, a longitudinally extending tongue 28, this tongue extending slightly less than half way across the span of the channel.

The panel 12 has an interlock member thereon which has, in cross-section, a longitudinally extending tongue portion 30 with serrated walls 32 which interlock into a slot 34 having serrated walls to lie against the walls of the tongue 30. Both the channel 20 and the tongue 30 may be installed by sliding endwise into place or may be pushed directly into their respective retaining slots. In FIG. 8 a modified form shows both the walls of the groove 16a and the outer walls of the channel 20 serrated to interlock in direct engagement.

The tongue 30 terminates at the top in a U-shaped joint element 36 having a base portion 38 lying flat against the top edge of the panel 12, as viewed in FIG. 1, and having a second leg 40 spaced therefrom to provide an opening to receive the tongue 28. Against the base of the U element 36 when the joint is assembled, as shown in FIG. 1, is a blocking strip 42.

In FIGS. 2 to 5, there are progressive schematic illustrations showing the manner in which the joint is assembled in a double lateral motion. In FIG. 2, it will be seen that the joint is moved upwardly into a space between the end of the tongue 28 and the side wall 26. It is shown in this position in FIG. 3. The panels are then moved so that panel 12 moves laterally relative to the panel 20 and the tongue 28 enters the space between the legs of the U-shaped member 36. When the parts reach this position, the strip 42 is driven into the space between the base of the U element 36 and the side wall 20 so that the joint is locked in place.

In FIG. 6, there is illustrated the manner in which the joint may be used for suspension on a vertical panel 50. In this assembly the panel element 52 is mounted on the vertical panel 50 by suitable screws 54. The panel 56 to be mounted carries on it the U-shaped element 58 having spaced legs 60 with serrated inner surfaces 62 to lock in spaced complemental slits in the panel 56.

In assembly, it will be seen that the panel 56 is lifted so that the outer leg of the strip 58 can enter the space behind a tongue 64 of the element 52 and then the parts are allowed to drop so that there is engagement of one leg of the U-shaped element 52 behind the tongue portion 64. It is not necessary to fill the space 60 in this instance because gravity will hold the parts together.

In FIG. 7, a modified outer channel is shown having a base 70, a side wall 72 on one side, and a side wall 74 on the other side, the side wall 74 carrying the longitudinally extending tongue portion 76. The base 70 is provided with a resilient lock strip 80 which is integrally connected at 82 to the channel but which has a downwardly extending edge 84. When assembled as illustrated in FIGS. 2 to 4, the edge 84 would first move upward into the recess 86 by reason of contact with the insertion element. After the U-shaped insertion element is moved into its permanent position engaging the tongue 76, then the lock strip 80 springs back to contact the upper corner of the base of the U-shaped element 36 which will then be locked in place. When the lateral insertion motion is complete, the parts will be locked permanently in position until intentionally disassembled.

It will thus be seen that pieces of furniture can be assembled at their destination by utilizing the above-described locking system, either by the ultimate consumer or by workmen who need not be skilled to accomplish the proper result. No glue and no screws, brackets or clamps are needed. Desk panels with vertical base stands can be assembled in this way and other modules of furniture can be connected in many different ways by utilizing the described joint.

I claim:

1. A joint for fastening together two structural elements such as furniture which comprises:
    a. a first element to be fastened,
    b. a first joint element comprising a first elongate channel member having in cross-section opposed legs with a longitudinally extending tongue extending from one leg toward the other and spaced from the base,
    c. means for fastening the first joint element along its length to the first element to be fastened,
    d. a second element to be fastened,
    e. a second joint element comprising a second elongate channel member having in cross-section spaced legs to receive said tongue in interlocking engagement, said second joint element being dimensioned relative to said first joint element to provide insertion space to permit insertion of said second joint element completely into said first channel member laterally prior to engagement of said tongue with said second joint element by a second lateral motion at right angles to said first lateral insertion, and f. means for fastening said second joint element to said second element to be fastened, the outer walls of the opposed legs of said first channel member of said first joint element being serrated, and said first element being provided with a groove to receive said first joint element having side walls to interlock with said serrations.

2. A joint for fastening together two structural elements such as furniture which comprises:
 a. a first element to be fastened,
 b. a first joint element comprising a first elongate channel member having in cross-section opposed legs with a longitudinally extending tongue extending from one leg toward the other and spaced from the base,
 c. means for fastening the first joint element along its length to the first element to be fastened,
 d. a second element to be fastened,
 e. a second joint element comprising a second elongate channel member having in cross-section spaced legs to receive said tongue in interlocking engagement, said second joint element being dimensioned relative to said first joint element to provide insertion space to permit insertion of said second joint element completely into said first channel member laterally prior to engagement of said tongue with said second joint element by a second lateral motion at right angles to said first lateral insertion, and
 f. means for fastening said second joint element to said second element to be fastened,
 the second joint element having an elongate projection on the outside of one of the legs thereof, and said second element having an elongate recess to receive and interlock with said projection.

3. A joint for fastening together two structural elements such as furniture which comprises:
 a. a first element to be fastened,
 b. a first joint element comprising a first elongate channel member having in cross-section opposed legs with a longitudinally extending tongue extending from one leg toward the other and spaced from the base,
 c. means for fastening the first joint element along its length to the first element to be fastened,
 d. a second element to be fastened,
 e. a second joint element comprising a second elongate channel member having in cross-section spaced legs to receive said tongue in interlocking engagement, said second joint element being dimensioned relative to said first joint element to provide insertion space to permit insertion of said second joint element completely into said first channel member laterally prior to engagement of said tongue with said second joint element by a second lateral motion at right angles to said first lateral insertion,
 f. means for fastening said second joint element to said second element to be fastened, and
 g. longitudinally extending means to interfit in the insertion space between the inside of one leg of said first joint element and the base of the channel of said second joint element after said second lateral motion to block dislodgment and fill said space.

4. A joint for fastening together two structural elements such as furniture which comprises:
 a. a first element to be fastened,
 b. a first joint element comprising a first elongate channel member having in cross-section opposed legs with a longitudinally extending tongue extending from one leg toward the other and spaced from the base,
 c. means for fastening the first joint element along its length to the first element to be fastened,
 d. a second element to be fastened,
 e. a second joint element comprising a second elongate channel member having in cross-section spaced legs to receive said tongue in interlocking engagement, said second joint element being dimensioned relative to said first joint element to provide insertion space to permit insertion of said second joint element completely into said first channel member laterally prior to engagement of said tongue with said second joint element by a second lateral motion at right angles to said first lateral insertion,
 f. means for fastening said second joint element to said second element to be fastened, and
 g. longitudinally extending means positioned in the space between the inside of one leg of said first joint element and the base of said second joint element after said second lateral motion to block dislodgment of said second joint element.

5. A joint as defined in claim 4 in which said means comprises a resilient projection movable out of said space in said first lateral motion and adapted to move by inherent resilience into said space after said second lateral motion.

6. A joint for fastening together two structural elements of an assembled unit such as furniture along a line of contact between the two elements which comprises:
 a. a first element to be fastened,
 b. first means forming a channel recess in a surface of said first element and an elongate first tongue extending in cross-section across said channel recess from one side toward the other spaced from the base of the channel leaving an insertion space between the end of the tongue and the other side of the channel,
 c. a second element to be fastened,
 d. second means forming an elongate joint member along a surface of said second element, said joint member having in cross-section a second tongue member insertable between said first tongue member and the base of said channel recess, said joint member being insertable into said insertion space of said channel recess in a lateral motion between said elements, said tongues being engaged in overlapped locked relation by a second lateral motion of said joint member relative to said channel in a direction at right angles to said first lateral motion, and e. means in said insertion space subsequent to said assembly to block disengagement of said first and second means.

* * * * *